Figure 1:
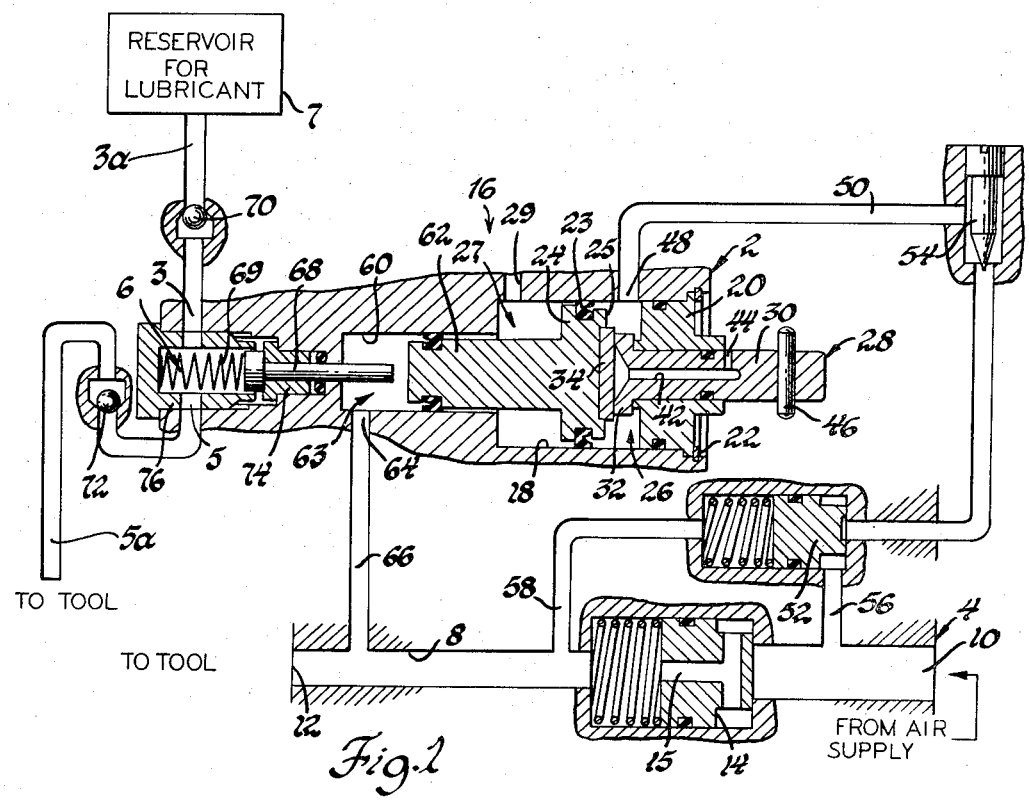

United States Patent
Callahan et al.

[15] 3,693,757
[45] Sept. 26, 1972

[54] LUBRICATING APPARATUS

[72] Inventors: James J. Callahan, Mentor; John Proctor Snow, Macedonia, both of Ohio

[73] Assignee: McCord Corporation

[22] Filed: Aug. 3, 1970

[21] Appl. No.: 60,411

[52] U.S. Cl. .....................184/7 D, 184/29, 184/56 A
[51] Int. Cl. .............................................F16n 25/02
[58] Field of Search .....184/56 R, 56 A, 7 D, 7 F, 29, 184/55 R; 92/154

[56] References Cited

UNITED STATES PATENTS

| | | | |
|---|---|---|---|
| 2,245,601 | 6/1941 | Medsker | 184/55 A |
| 3,581,845 | 6/1971 | Nederynen | 184/56 A |
| 3,487,892 | 1/1970 | Kiefer | 184/7 D X |
| 2,667,236 | 1/1954 | Graves | 184/56 X |
| 2,719,603 | 10/1955 | LeClair | 184/29 X |

*Primary Examiner*—Manuel A. Antonakas
*Attorney*—McGlynn, Reising, Milton & Ethington

[57] ABSTRACT

Lubricating apparatus for automatically providing a constant supply of lubricant to air operated tools during the operation of such tools, including an expansible and contractible pump chamber having an intake port for connection with a supply of lubricant and a delivery port for delivering lubricant from the pump chamber to the tool being lubricated. The apparatus includes a main air passage for connection with a source of air under pressure for driving the tool, and a normally closed control valve controls flow through the main air passage and is movable to an open position to permit flow through the air passage in response to a pressure drop between the upstream and downstream sides of the valve caused by starting the tool into operation. Means operable in response to air flow through the main passage causes the pump chamber to alternately expand and contract and pump lubricant to the working parts of the tool so long as the tool is in operation. The cycle of the pump can be selectively adjusted to increase or decrease the rate of flow of lubricant to the tool.

22 Claims, 4 Drawing Figures

INVENTORS
James J. Callahan &
BY John P. Snow
Barnard, McGlynn & Reising
ATTORNEYS

LUBRICATING APPARATUS

This invention relates generally to lubricating apparatus, and is particularly concerned with apparatus for automatically providing a constant supply of lubricant to air operated tools, valves, cylinders and other devices during their operation.

Numerous tools are used in shops and manufacturing plants and throughout various industries that are powered by pneumatic motors from sources of compressed air. For proper operation of such tools, it is of course necessary to provide adequate lubrication for certain parts of the tool itself, and in some cases, such as drills and the like, it is necessary to provide lubrication between the tool and the workpiece being operated upon by the tool.

An object of this invention is to provide lubricating apparatus for air operated tools and other air operated devices that can be connected into the compressed air supply of such tool and operated thereby simultaneously with the operation of the tool to constantly deliver lubricant to the tool during its operation.

Another object of this invention is to provide self-contained lubricating apparatus for delivering lubricant to air operated tools and the like that is operated by the air supply that provides power for the particular tool, and which starts into operation automatically when the tool starts into operation and operates during the entire time that the air is being supplied to power the tool, and which automatically shuts down when the tool shuts down.

Another object is to provide lubricating apparatus for air operated tools and other air operated devices which can be powered by the air supply for the tool and automatically starts into operation upon operation of the tool, and which is self-cycling and is selectively adjustable in its lubricant delivery rate.

In achievement of the foregoing, and other objects, lubricating apparatus according to the present invention includes an expansible and contractible pump chamber having an intake port for connection with a supply of lubricant and a delivery port for delivering lubricant from the pump chamber. The apparatus is formed with a main air passage for conducting compressed air to the tool for operating the tool. The main air passage has an inlet end for connection with a source of air under pressure and an outlet for connection with an air operated tool. A normally closed control valve controls flow through the main air passage and is movable to an open position when the pressure on the outlet side of the control valve drops when the tool starts into operation. In accordance with the invention, the flow of air through the main passage past the control valve causes the pump chamber to alternately expand and contract and pump lubricant to the tool being operated by the compressed air.

The pump chamber for the lubricant is caused to alternately expand and contract in accordance with the contraction and expansion, respectively, of a working chamber which is supplied with air from the main passage only when the control valve is open to permit flow through the main air passage. Mechanism in the working chamber in the form of a reciprocating piston and a control plunger responds to flow of air into the working chamber from the main air passage to cause the working chamber to alternately expand and contract. With each cycle, the working chamber expands to a predetermined maximum volume and thereafter vents and contracts to a predetermined minimum volume. A pump plunger is caused to reciprocate in the pump chamber to contract and expand the pump chamber in accordance with expansion and contraction, respectively, of the working chamber. The cycling rate of the working chamber, and hence of the pump chamber, can be selectively varied by adjusting the rate of flow of air into the working chamber by changing the position of an adjustable needle valve in the supply passage to the working chamber.

Other objects, advantages and features of the invention will become apparent from the following description taken in connection with the accompanying drawing in which:

FIGS. 1 through 4 are sectional, diagramatic views of apparatus embodying the invention and sequentially illustrating the position of the parts during a cycle of operation.

In the drawings, reference numeral 2 collectively designates a body for housing part of the mechanism of the lubricating apparatus, and reference numeral 4 collectively designates a base member for housing control and supply valves for the apparatus, and which is attached to the body 2 by bolts or other conventional means. Formed in the body 2 is an expansible and contractible pump chamber 6 having an intake port 3 for connection with a supply of lubricant in a container or reservoir 7 through a passage 3a and a delivery port 5 for delivering lubricant from the pump chamber through a passage 5a. A main air passage 8 is formed in body 2 having an inlet end 10 for connection with a source of air under pressure, and an outlet end 12 for connection with an air operated tool or the like through any suitable connection such as a flexible hose. A normally closed control valve 14 is mounted in the main passage in a control valve chamber 13 and is caused to move to an open position and permit flow through passage 8 in response to a pressure drop between the inlet 10 and outlet 12 upon demand by the tool being driven by the compressed air. Control valve 14 is biased to a closed position by a spring 17. Reference numeral 16 collectively designates means operable in response to flow through the main passage 8 past valve 14 to cause the pump chamber 6 to alternately expand and contract to deliver lubricant through passage 5a to the tool being driven by the supply of air through passage 8.

Formed in body 2 is a cylindrical bore 18. The open end of bore 18 is closed by an end wall member 20 which is secured in position by a snap ring 22 or other conventional means. Reciprocably mounted in bore 18 is a piston member 24, one face 25 of which cooperates with the end wall member 20 to define an expansible and contractible working chamber 26. Piston 24 is provided with a sealing member 23 for engaging the side wall of bore 18. An exhaust chamber 27 is defined on the side of piston 24 opposite the working chamber 26 and is connected through a port 29 with ambient atmosphere.

Slidably mounted in a central cylindrical opening of the end wall member 20 is a control plunger 28 which is operable to cause the working chamber 26 to vent and contract when the volume of the working chamber 26 exceeds a predetermined maximum. The control plunger has a stem portion 30 slidably mounted in the central opening of the end wall member 20, and an enlarged end portion 32 is formed on the stem portion 30 and is received in the working chamber 26.

The right hand face 25 of piston 24 defines a movable wall for the working chamber 26, and the enlarged end portion 32 of plunger 28 has a leading or front face 36, (the left hand face in the drawings) which is engageable with the movable wall 25, and a trailing or rear face 38 (the right hand face in the drawings) which projects generally radially outwardly from the stem 30 of plunger 28 and is subject to the expanding pressure in the working chamber 26 when the leading face is seated against piston 24. Projecting from the end wall member 20 into the working chamber 26 is an abutment 40 which engages the rear or trailing face 38 of the end portion 32 to maintain a space for fluid between the end wall 20 and the portion of face 38 that projects beyond the abutment and is acted against by the pressure in the working chamber 26.

A vent port 42 is formed in the control plunger 28, one end of the vent port communicating with a recess in face 36 of the end portion 32, and the other end of the vent port communicating at 44 with a surface of the control plunger 28 at a location spaced from face 36 a distance such that the other end 44 is uncovered by the end wall member 20 to communicate with atmosphere only when the face 38 of the end portion 32 is engaged with the abutment member 40. Transversely mounted in the stem 30 of plunger 28 is a stop pin 46 for limiting the travel of the plunger toward the left, as viewed in the drawing, due to the engagement of pin 46 with an abutment 47 projecting from the outer surface of end wall member 20.

A supply port 48 for the working chamber 26 is connected with the main air passage 8 by a supply passage 50. Flow through the supply passage 50 is controlled by a normally closed supply valve 52 received in a supply valve chamber 57, and which moves to an open position only in response to fluid flow in the main passage 8. The rate of flow of fluid into the working chamber 26 is determined by the position of an adjustable needle valve 54.

The supply valve 52 is biased to a closed position by a spring 55 to prevent flow through supply passage 50, and the annular front face 52a of valve 52 is subjected to the pressure from air passage 8 on the inlet side of control valve 14 through a branch passage 56, and the rear face 52b of valve 52 is subjected to the pressure from main passage 8 on the outlet side of control valve 14 through a branch passage 58. Consequently, when the pressure in passage 8 between outlet 12 and control valve 14 (or on the outlet or downstream side of control valve 14) drops due to the tool or other air driven device being brought into operation, the reduced pressure in the outlet portion of passage 8 is sensed through branch passage 58 by the supply valve 52. Thus, the pressure drop across control valve 14 when air flows through the main passage 8 also causes the supply valve 52 to move to an open position and admit air through supply passage 50 past the needle valve 54 to the working chamber 26.

The cylindrical bore 18 is stepped with a reduced portion 60 located on the opposite side of piston 24 from the working chamber, and the piston 24 has a reduced portion 62 which projects into the reduced portion 60 of the bore. Mounted on the reduced portion 62 is a sealing member 65 which slidably engages the side wall of the reduced portion 60 of the bore. The end wall of the reduced portion of the bore cooperates with the end of the reduced portion 62 of the piston to define a return pressure chamber 63. Chamber 63 is connected through a port 64 and a return pressure branch passage 66 with the outlet side of the main passage 8.

The intake port 3 of the pumping chamber 6 is connected with the lubricant container 7, and the passage 3a between intake port 3 and the lubricant container 7 is controlled by a check valve 70 which permits flow from the lubricant container 7 to the pumping chamber 6, but prevents flow in the opposite direction. The delivery port 5 of the pumping chamber 6 is connected with the parts to be lubricated of the tool or other device being operated by the supply of air through passage 8, and a check valve 72 in passage 5a permits the lubricant to be delivered from the pumping chamber 6 through the delivery port 5, but prevents flow in the opposite direction. A pump plunger 68 is mounted in chamber 6 and moves toward the left against a spring 69 to contract the pumping chamber 6, the spring 69 biasing the plunger 68 to the position shown in FIG. 1 to expand chamber 6.

Chamber 6 is defined by a cylindrical housing or plug member 76 inserted into the large diameter portion of a stepped diameter cylindrical bore 71 formed in the body 2 in coaxial relationship with the cylindrical bore 18. The stem of plunger 68 is mounted in a cylindrical bearing 74 received in the small diameter portion of bore 71 and projects through an opening between the coaxial bores into the low pressure chamber 63. Thus, the plunger stem 68 is engageable by the reduced portion 62 of piston 24.

FIG. 1 illustrates the position of the parts when there is no air flow through passage 8 such as would be the case when the tool or other device connected with the air passage 8 is not in operation. The outlet 12 of passage 8 may be connected with the air driven motor of the tool to be operated either directly or by a flexible hose or the like, and the discharge passage 5a from the lubricant pumping chamber 6 may similarly be connected with the part or parts to be lubricated. When the tool is not in operation, the pressure in passage 8 on the inlet and outlet sides of control valve 14 is the same, and control valve 14 is in its closed position due to spring 17 so that there is no flow through passage 8.

Pressure on the outlet portion of passage 8 acts through branch passage 66 in chamber 63 on the reduced portion 62 of piston 24 to urge piston 24 to the right to the position shown in FIG. 1 to place the working chamber 26 in a contracted condition of minimum volume. Since the pressure in chamber 63 acts on the reduced portion 62 of piston 24 to urge the piston toward the right, the working chamber 26 can expand only when the pressure in the working chamber 26 acting against face 25 of piston 24 is sufficient to exert a force on piston 24 greater than the force exerted by the pressure in chamber 63.

Figure 2:
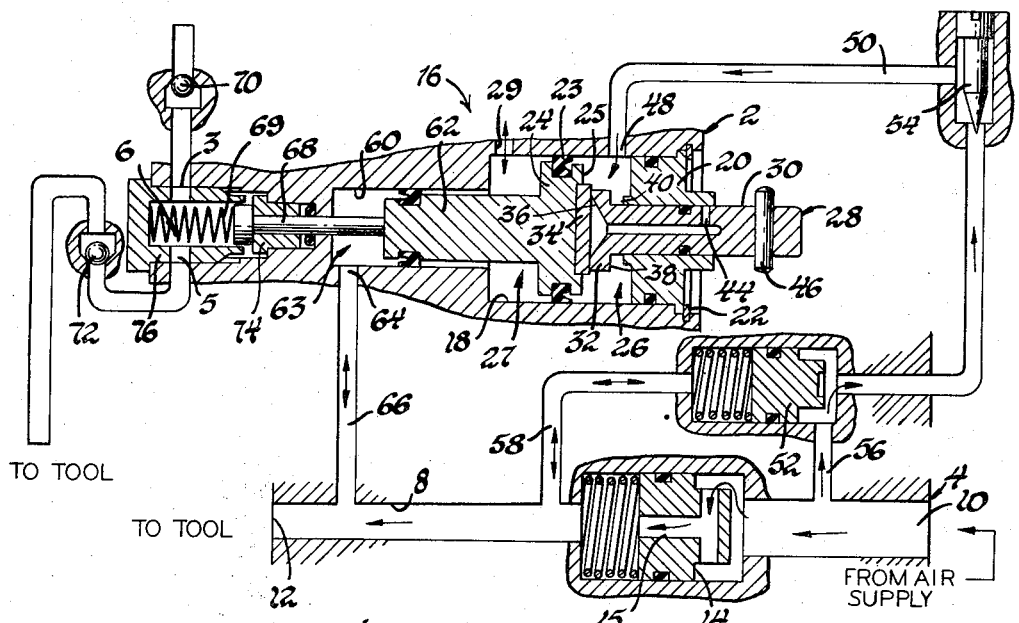

When the tool is brought into operation, the pressure on the outlet side of the main passage 8 drops due to the demand of the tool, and the resulting pressure differential on control valve 14 causes the control valve 14 to move to an open position as shown in FIG. 2 permitting continuous flow through passage 8. The reduced size of the T-shaped passage 15 of control valve 14 with respect to the size of the inlet side of passage 8 provides a pressure drop across valve 14 which serves to hold the valve in an open position. The pressure drop across valve 14 is sensed by supply valve 52 through branch passages 56 and 58, and valve 52 is thus moved to an open position by the pressure differential to permit flow from the inlet side of passage 8 through branch passage 56 and the supply passage 50 to the working chamber 26.

When the pressure in chamber 26 exceeds a predetermined reference pressure, that is, the pressure sufficient to overcome the pressure in chamber 63 acting on piston 24 in the opposite direction, the movable wall defined by the right-hand face 25 of piston 24, and the rear face 38 of the enlarged end portion 32 of plunger 28 are acted upon by this pressure and caused to move toward the left and expand chamber 26 from the contracted condition of minimum volume shown in FIG. 1. Vent port 42 is shut off from communication with chamber 26 due to the engagement of the front face 36 of plunger 28 with the sealing pad 34 mounted on the right-hand face 25 of piston 24. As plunger 28 moves toward the left, the end 44 of vent port 42 moves out of communication with atmosphere and is closed by the surrounding wall portion of the central opening through end wall member 20. As shown in FIG. 2, movement of the parts toward the left causes the reduced end portion 62 of piston 24 to engage plunger 68 to thereby begin contracting the pumping chamber 6.

Figure 3:
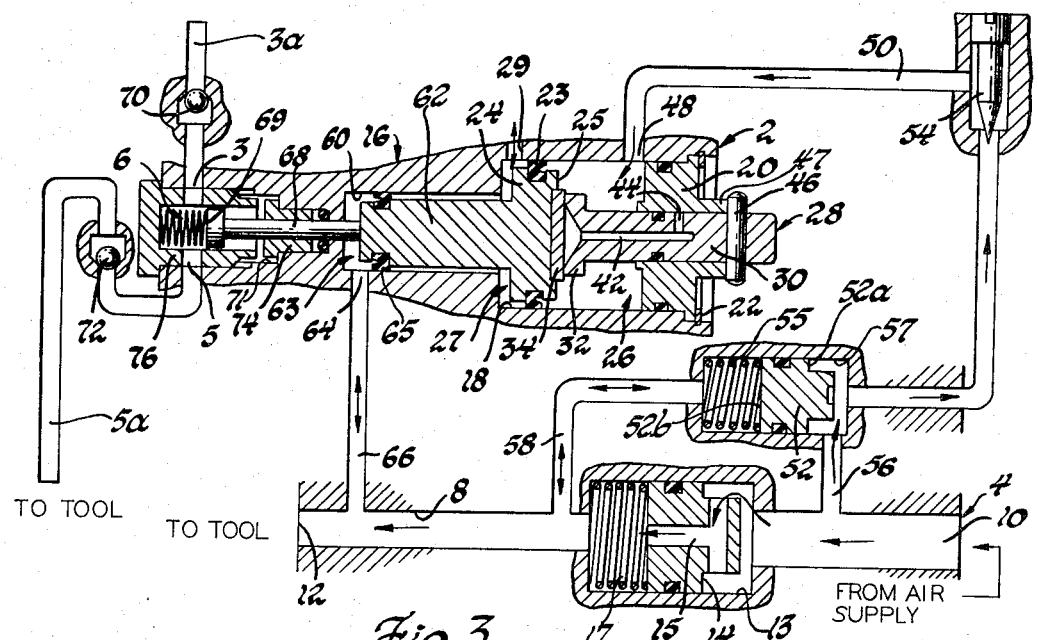

The control plunger 28 remains in engagement with the movable wall 25 and moves with wall 25 until pin 46 engages the raised abutment 47 as shown in FIG. 3. In this position, plunger 28 is at the end of its stroke due to the engagement of pin 46 with the end wall member 20, but piston 24 has not yet reached the end of its stroke and continues to move so that piston 24 separates from plunger 28. In the position of the parts shown in FIG. 3, pump chamber 6 is substantially in its fully contracted position and has expelled lubricant from the pump chamber through delivery port 5 past check valve 72.

Figure 4:
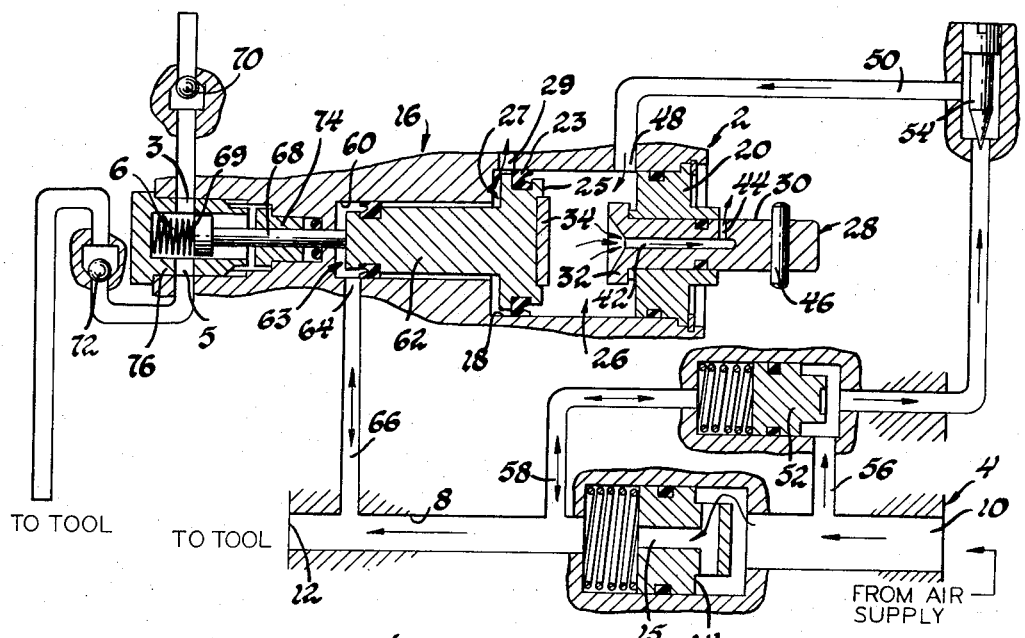

When piston 24 separates from plunger 28, the front face 36 of plunger 28 is immediately exposed to the pressure in chamber 26, which acts to return plunger 28 toward the right, as viewed in the drawings, until the rear face 38 engages the abutment 40 as shown in FIG. 4. As soon as plunger 28 returns to the position of FIG. 4, the pressure in chamber 26 is vented through vent port 42 since the end 44 of vent port 42 has again been brought into communication with atmosphere. The pressure in chamber 63, being greater than atmospheric pressure, acts on the reduced portion 62 of the piston to return the piston to the start position of FIG. 1 and to therefore contract chamber 26 to its fully contracted condition. Spring 69 causes plunger 68 to return to the position of FIG. 1, which movement of plunger 68 causes additional lubricant to be drawn past check valve 70 into the pumping chamber 6.

As soon as the sealing pad 34 closes vent port 42, another expansion cycle begins. The cycle of expansion and contraction of chamber 26 is repeated so long as air flows through the main passage 8. When flow through passage 8 stops, the pressure on both sides of control valve 14 is equalized and the control valve moves to its closed position. This action is of course followed by the closing of supply valve 52 to shut down the operation of the apparatus. The apparatus automatically starts into operation upon operation of the air driven tool or other device connected with main passage 8, and automatically shuts down when operation of the tool ceases.

The adjustable needle valve 54 controls the rate of delivery of lubricant to the tool. By increasing the rate of flow through supply passage 50, the cycling rate is increased, and conversely, by decreasing the rate of flow through supply passage 50, the cycling rate is correspondingly decreased.

Thus, the lubricating apparatus shown in the drawings includes an expansible and contractible pump chamber 6 having an intake port 3 for connection with a supply of lubricant and a delivery port 5 for delivering lubricant from pump chamber 6; a main passage 8 having an inlet 10 for connection with a source of air under pressure and an outlet 12 for connection with an air operated tool or the like; a normally closed control valve 14 controlling flow through the main passage 8 and movable to an open position in response to a pressure drop between inlet 10 and outlet 12 to permit flow through the main passage 8; and means 16 operable in response to flow through the main passage to cause the pump chamber 6 to alternately expand and contract; and means 54 for selectively varying the rate of expansion and contraction of pump chamber 6 during flow through main passage 8.

The means 16 operable to cause the pump chamber 6 to alternately expand and contract comprises a working chamber 26 and mechanism 24, 28 for causing the working chamber to alternately expand and contract in response to flow through passage 8. The control plunger 28 of the mechanism is operable to cause the working chamber 26 to vent and contract when the volume of the working chamber exceeds a maximum determined by the engagement of pin 26 with the end wall member 20.

While one specific form of the invention has been illustrated and described in the foregoing specification and accompanying drawings, it should be understood that the invention is not limited to the exact construction shown. Alterations and variations in the construction and arrangement of parts, all falling within the scope and spirit of the invention, will be apparent to those skilled in the art.

We claim:

1. Lubricating apparatus comprising: means defining a working chamber having a supply port for connection with a source of fluid pressure; means defining a pressure responsive wall for said working chamber operable to expand the working chamber from a contracted condition of minimum volume when the pressure in the working chamber is greater than a predetermined reference pressure, and to contract the chamber to said contracted condition when the pressure in said pressure chamber is less than said reference pressure; a control plunger mounted in said working chamber, said control plunger being engageable with said movable wall when the working chamber is in the retracted condition and movable with said movable wall when the pressure in said working chamber is greater than the reference pressure until the volume of the working chamber exceeds a predetermined maximum; a vent port connecting said working chamber with a pressure less than the reference pressure only when said control plunger is disengaged from said movable wall; a main body portion having a cylindrical bore formed therein; an end wall member closing the open end of said bore; said movable wall being received in said bore and cooperating with said end wall member to define said working chamber; a piston reciprocably mounted in said bore, one face of said piston defining said movable wall; said control plunger including a stem portion slidably mounted in said end wall member; an enlarged end portion formed on said stem and received in said working chamber, said enlarged end portion having a leading face engageable with said one face of said piston and a trailing face projecting generally radially outwardly from said stem portion and subject to the pressure in said working chamber when said leading face is engaged with said one face of said piston; an abutment projecting from said end wall into said working chamber for engaging said trailing face to maintain a space for fluid between said end wall and at least a portion of said trailing face; said vent port being formed in said control plunger with one end of said vent port communicating with said leading face and the other end of said vent port communicating with a surface of said control plunger at a location spaced from said one end a distance such that said other end is uncovered by said end wall member only when said trailing face is engaged with said abutment member; a resilient sealing member secured to said one face of said piston for engagement by said leading face of said control plunger to seal off said vent port from said working chamber; stop means for limiting the travel of said plunger with said piston and causing the plunger to disengage from said piston when the volume of the working chamber exceeds the predetermined maximum; said stop means comprising a stop pin mounted in the stem of said plunger on the opposite side of said end wall from said working chamber and engageable with said end wall member; a main passage for conducting fluid under pressure from a source to a fluid pressure operated device; a supply passage connecting said main passage with the supply port of said working chamber; means operable to permit flow through said supply passage only in response to fluid flow through said main passage; said last named means including a normally closed control valve in said main passage movable to an open position in response to a decrease in the pressure on the downstream side of said control valve with respect to the pressure on the upstream side of said control valve; a normally closed supply valve in said supply passage movable to an open position in response to fluid flow through the main passage past said control valve; means in said supply passage for adjustably restricting the flow through said supply passage to said working chamber; a return pressure branch passage connecting the downstream portion of said main passage with said bore on the opposite side of said piston from said working chamber; said bore being stepped with a reduced portion located on the opposite side of said piston from said working chamber, said piston having a reduced portion projecting into the reduced portion of said bore, the reduced portion of said bore having an end wall cooperable with the reduced portion of said piston to define a return pressure chamber, said return pressure branch passage extending between said return pressure chamber and said main passage such that pressure in said return pressure chamber urges said piston in the opposite direction to the pressure in said working chamber; a pumping chamber having an intake port adapted to be connected with a supply of lubricant and a delivery port, and means operable to expand and contract said pumping chamber in response to movement of said piston in said bore.

2. Lubricating apparatus as claimed in claim 1 including a check valve controlling said intake port movable to an open position in response to expansion of said pump chamber to permit lubricant to be drawn into said pump chamber and movable to a closed position in response to contraction of said pump chamber; and a check valve controlling said delivery port movable to an open position upon contraction of said pump chamber to permit lubricant to be delivered from said pump chamber, and movable to a closed position in response to expansion of said pump chamber.

3. Lubricating apparatus as claimed in claim 2 including a pumping plunger reciprocably mounted in said pump chamber and connected with said piston for expanding and contracting said pump chamber in response to contraction and expansion, respectively, of said working chamber.

4. Lubricating apparatus as claimed in claim 3 wherein said pumping plunger has a stem projecting into said return pressure chamber for engagement by said piston, and further including a spring in said pump chamber biasing said pumping plunger to a position in which the pump chamber is expanded.

5. Lubricating apparatus comprising: an expansible and contractible pump chamber having an intake port for connection with a supply of lubricant and a delivery port for delivering lubricant from said pump chamber; a main passage having an inlet for connection with a source of air under pressure and an outlet for connection with an air operated tool or the like; a normally closed control valve controlling flow through said main passage and movable to an open position in response to a pressure drop between said inlet and outlet to permit flow through said main passage; and means operable in response to flow through said main passage to mechanically expand and contract said pump chamber continuously during the time that air flows through said main passage past said control valve.

6. Lubricating apparatus as claimed in claim 5 further including means for selectively varying the rate of expansion and contraction of said pump chamber during flow through said main passage.

7. Lubricating apparatus as claimed in claim 5 wherein said means operable to cause the pump chamber to alternately expand and contract comprises a working chamber and mechanism for causing said working chamber to alternately expand and contract in response to flow through said main passage.

8. Lubricating apparatus as claimed in claim 7 including a cylindrical bore with an end wall member closing the open end thereof; and wherein said mechanism includes a piston in said bore cooperable with said end wall member to define said working chamber, said piston being movable toward and away from said end wall member to respectively contract and expand said working chamber.

9. Lubricating apparatus as claimed in claim 8 wherein said mechanism includes a control plunger mounted in said end wall member operable to cause said working chamber to vent and contract when the volume of the working chamber exceeds a predetermined maximum.

10. Lubricating apparatus as claimed in claim 8 wherein said control plunger has a stem portion slidably mounted in said end wall member and an enlarged end portion formed on said stem and received in said working chamber and engageable with said piston.

11. Lubricating apparatus as claimed in claim 7 including a supply port for said working chamber; a supply passage connecting said supply port with said main passage; and means operable to permit flow through said supply passage only in response to fluid flow in said main passage.

12. Lubricating apparatus as claimed in claim 11 wherein said last named means includes a normally closed supply valve controlling said supply passage and movable to an open position in response to fluid flow through said main passage past said control valve.

13. Lubricating apparatus as claimed in claim 12 further including means for selectively varying the rate of expansion and contraction of said pump chamber during flow through said main passage.

14. Lubricating apparatus as claimed in claim 13 wherein said last named means comprises a needle valve in said supply passage adjustable to vary the rate of flow through said supply passage.

15. Lubricating apparatus comprising: a base member formed with a main air passage having an inlet for connection with a source of air under pressure and an outlet for connection with an air driven tool or the like; a normally closed control valve between said inlet and outlet controlling flow through said main passage and movable to an open position in response to a pressure drop between said inlet and outlet to permit flow through said main passage; a supply valve chamber formed in said base member; a supply passage formed in said base member having one end in communication with said supply valve chamber; a first branch passage connecting said supply valve chamber with said control valve and a second branch passage connecting the supply valve chamber with the branch chamber between the outlet and said control valve; a supply valve received in said supply valve chamber and having an open position to permit flow between said one branch passage and said supply passage and a closed position to shut off communication between said one branch passage and said supply passage; said supply valve being biased to its closed position and responsive to a decrease in pressure in said second branch passage with respect to the pressure in said first branch passage to move to its open position; a return pressure passage formed in said base member communicating at one end with said main passage between the outlet and control valve; a body member attached to said base member; a pump chamber formed in said body member; a bore formed in said body member connected with the supply passage in said base member; and means in said bore operable in response to flow through said supply passage to cause said pump chamber to alternately expand and contract.

16. Lubricating apparatus comprising: an expansible and contractible pump chamber having an intake port for connection with a supply of lubricant and a delivery port for delivering lubricant from said pump chamber; a main passage having an inlet for connection with a source of air under pressure and an outlet for connection with an air operated tool or the like; a normally closed control valve controlling flow through said main passage and movable to an open position in response to a pressure drop between said inlet and said outlet to permit flow through said main passage; means operable in response to flow through said main passage to cause said pump chamber to alternately expand and contract; said last named means comprising a working chamber and mechanism for causing said working chamber to alternately expand and contract in response to flow through said main passage; a cylindrical bore with an end wall member closing the open end thereof; said mechanism including a piston in said bore cooperable with said end wall member to define said working chamber, said piston being movable toward and away from said end wall member to respectively contract and expand said working chamber; said control plunger having a stem portion slidably mounted in said end wall member and an enlarged end portion formed on said stem and received in said working chamber and engageable with said piston, one face of said piston defining a movable wall for said working chamber; the enlarged end portion of said control plunger having a leading face engageable with said one face of said piston and a trailing face projecting generally radially outwardly from said stem portion and subject to expanding pressure in said working chamber when said leading face is engaged with said one face of said piston.

17. Lubricating apparatus as claimed in claim 16 including an abutment projecting from said end wall member into said working chamber for engaging said trailing face to maintain a space for fluid between said end wall and at least a portion of said trailing face.

18. Lubricating apparatus as claimed in claim 17 wherein a vent port is formed in said control plunger and one end of said vent port communicates with said leading face.

19. Lubricating apparatus as claimed in claim 18 wherein the other end of said vent port communicates with a surface of said control plunger at a location spaced from said one end a distance such that said other end is uncovered by said end wall member only when said trailing face is engaged with said abutment member.

20. Lubricating apparatus as claimed in claim 19 including a resilient sealing member secured to said one face of said piston for engagement by said leading face of said control plunger to seal off said vent port from said working chamber.

21. Lubricating apparatus as claimed in claim 19 including stop means for limiting the travel of said plunger with said piston and causing the plunger to disengage from said piston when the volume of the working chamber exceeds the predetermined maximum.

22. Lubricating apparatus as claimed in claim 21 wherein said stop means comprises a stop pin mounted in the stem of said plunger on the opposite side of said end wall from said working chamber and engageable with said end wall member.

* * * * *